(12) United States Patent
Marcopulos (10) Patent No.: US 12,304,665 B2
(45) Date of Patent: May 20, 2025

(54) SPACECRAFT THRUSTER VOLTAGE MEASUREMENT UNIT

(71) Applicant: Maxar Space LLC, Palo Alto, CA (US)

(72) Inventor: Theodore Marcopulos, Loomis, CA (US)

(73) Assignee: Maxar Space LLC, Palo Alto, CA (US)

( * ) Notice: Subject to any disclaimer, the term of this patent is extended or adjusted under 35 U.S.C. 154(b) by 329 days.

(21) Appl. No.: 17/742,840

(22) Filed: May 12, 2022

(65) Prior Publication Data
US 2023/0365277 A1 Nov. 16, 2023

(51) Int. Cl.
*B64G 1/40* (2006.01)
*B64G 1/42* (2006.01)

(52) U.S. Cl.
CPC .............. *B64G 1/405* (2013.01); *B64G 1/428* (2013.01)

(58) Field of Classification Search
CPC ....................................................... B64G 1/428
See application file for complete search history.

(56) References Cited

PUBLICATIONS

Dannenmayer "Scaling laws and electron properties in Hall effect thrusters" (Year: 2013).*
Ross "Probe studies of a Hall thruster at low voltages" (Year: 2011).*
Garner, Charles E. et al. "Low-Power Operation and Plasma Characterization of a Qualification Model SPT-140 Hall Thruster for NASA Science Missions", Jul. 27, 2015, pp. 1-16.
Manzella, David et al., "Performance Evaluation of the SPT-140", 25th International Electric Propulsion Conference, Aug. 24-28, 1997, pp. 1-10.

* cited by examiner

*Primary Examiner* — David P. Olynick
(74) *Attorney, Agent, or Firm* — Pearl Cohen Zedek Latzer Baratz LLP (57) ABSTRACT

A voltage measurement apparatus for a spacecraft thruster includes a thruster interface having a platform and at least one spacer element configured to attach the platform to the thruster. At least one probe is mounted to the thruster interface with the probe configured to engage an anode assembly of the thruster when the thruster interface is attached to the thruster. The apparatus also includes voltage metering circuitry coupled to the at least one probe, the voltage metering circuitry configured to be powered by the spacecraft thruster when the spacecraft thruster is powered on.

20 Claims, 9 Drawing Sheets

SPACECRAFT THRUSTER VOLTAGE MEASUREMENT UNIT

BACKGROUND

Spacecraft, such as satellites, shuttles, space stations, inter-planet traveling crafts, and rockets, often have an electric propulsion (EP) system that includes a power processing unit (PPU), an electrical thruster (e.g., a Hall Effect Thruster), and a propellant management assembly (PMA). A Hall-effect thruster (HET) is a type of ion thruster where the propellant is accelerated by an electric field. Hall-effect thrusters use a magnetic field to limit the electrons' axial motion and then use them to ionize propellant, efficiently accelerate the ions to produce thrust, and neutralize the ions in the plume. The Hall effect thruster has been widely developed and used and has been the subject of a great number of publications. The operating principles and characteristics of such devices have been well known since the 1970's.

Conventionally a PPU is designed to support a specific model of electrical thruster, e.g., a specific model of a Hall Effect Thruster. In order to ensure proper operation, manufacturers must measure 300-600 VDC on the anode ring of an installed thruster. This voltage level (300-600 VDC) is lethal and existing methods of testing an installed thruster have involved handheld high voltage measurement probes contacting the thrusters anode ring. Making this measurement is important as it is the last test possible opportunity to ensure that the thruster is properly electrically connected to the spacecraft PPU electronics.

BRIEF SUMMARY

Certain embodiments of the present technology are directed to, a voltage measurement apparatus for a spacecraft thruster. The voltage measurement apparatus also includes a thruster interface may include a platform and at least one spacer element configured to attach the platform to the thruster. The apparatus also includes at least one probe mounted to the thruster interface; the probe configured to engage an anode assembly of the thruster when the thruster interface is attached to the thruster. The apparatus also includes voltage metering circuitry coupled to the at least one probe, the voltage metering circuitry configured to be powered by the spacecraft thruster when the spacecraft thruster is powered on.

Implementations may include a voltage measurement apparatus where the thruster interface includes a plurality of spacer elements, each spacer element may include at least one arm extending from the platform, the arm having an end, each end adapted to couple to the spacecraft thruster. Implementations may include a voltage measurement apparatus further including at least one adapter bracket, the adapter bracket configured to couple to the thruster interface between the spacecraft thruster and the at least one arm to couple the at least one arm to the thruster. The adapter may include at least one guide post and the at least one arm including at least one guide bore sized to receive the guide post to align the voltage measurement apparatus relative to the spacecraft thruster. Implementations may include voltage metering circuitry which is electrically coupled to the at least one probe and includes a voltage meter having a display, the voltage meter measuring voltage of the anode assembly and including circuitry converting the voltage of the anode assembly to a voltage powering the meter. Implementations may include a voltage measurement apparatus including at least two probes, each probe may include a spring-loaded contact pin mounted on one side of the platform at a position of the platform which aligns with the anode assembly when the thruster interface is attached to the thruster by the spacer element. The thruster interface may include a first adapter bracket and a second adapter bracket, each adapter bracket including at least a respective first guide post and a respective second guide post; the spacer element includes a first leg, a second leg and a third leg; each said leg includes a foot; and each foot including a guide bore sized to receive the respective first guide post and a respective second guide post. The platform and spacer elements may include high voltage insulating/thermally resistant plastic.

Another general aspect includes a voltage measurement apparatus for a spacecraft thruster. The voltage measurement apparatus also includes a thruster interface may include a first adapter bracket and a second adapter bracket, each adapter bracket including at least a respective first guide post and a respective second guide post, the thruster interface including an interface base having a platform and a plurality of legs extending in a direction from the platform, the legs including ends configured to attach the platform to the spacecraft thruster and position the platform relative to the spacecraft thruster, each end having a guide bore sized to receive the respective first guide post and a respective second guide post. The apparatus also includes at least one probe mounted to the platform in the direction of the legs, the at least one probe configured to engage an anode assembly of the spacecraft thruster when the thruster interface is attached to the thruster. The apparatus also includes voltage metering circuitry coupled to the at least one probe, the voltage metering circuitry configured to be powered by the spacecraft thruster when the spacecraft thruster is powered on.

Implementations may include a voltage measurement apparatus where the voltage metering circuitry is electrically coupled to the at least one probe and includes a voltage meter having a display, the voltage meter measuring voltage of the anode assembly and including circuitry converting the voltage of the anode assembly to a voltage powering the meter. Implementations may include a voltage measurement apparatus including at least two probes, each probe may include a spring-loaded contact pin mounted on one side of the platform at a position of the platform which aligns with the anode assembly when the thruster interface is attached to the thruster by the spacer element. Implementations may include a voltage measurement apparatus wherein each end includes a foot, and each foot includes the guide bore. The platform and arms may include high voltage insulating/thermally resistant plastic. Implementations may include a voltage measurement apparatus wherein the first adapter bracket includes the respective first guide post and the second adapter bracket includes the respective second guide post, the first adapter bracket further includes a third guide post, a first of the plurality of legs is positioned to engage the respective first guide post, a second of the plurality of legs is positioned to engage the respective second guide post, and a third of the plurality of legs is positioned to engage the third guide post. Each leg may have a length such that each guide bore of each leg is at an equal distance from the platform thereby allowing each guide bore to simultaneously engage each guide post.

Yet another aspect includes a voltage measurement apparatus for a spacecraft thruster. The voltage measurement apparatus also includes a thruster interface may include a first adapter bracket and a second adapter bracket, the first adapter bracket including a first guide post and a second guide post, the second adapter bracket including a third guide post, an interface base having a platform and a plurality of legs extending in a direction from the platform, each leg including a foot configured to attach the platform to the first adapter bracket or the second adapter bracket and position the platform relative to the spacecraft thruster, each foot having a guide bore sized to receive one of said guide posts, each leg having a length such that each guide bore of each leg is at an equal distance from the platform thereby allowing each guide bore to simultaneously engage each guide post. The apparatus also includes at least one contact probe mounted to the platform in the direction of the legs, the at least one probe configured to engage an anode assembly of the spacecraft thruster when the thruster interface is attached to the thruster. The apparatus also includes voltage metering circuitry coupled to the at least one probe, the voltage metering circuitry powered by the spacecraft thruster when the spacecraft thruster is powered on. Other embodiments of this aspect include corresponding computer systems, apparatus, and computer programs recorded on one or more computer storage devices, each configured to perform the actions of the methods.

Implementations may include a voltage measurement apparatus where the platform and arms may include high voltage insulating/thermally resistant plastic, and the feet and adapter bracket may include steel. The voltage measurement apparatus including at least two probes, each probe may include a spring-loaded contact pin mounted on one side of the platform at a position of the platform which aligns with the anode assembly when the thruster interface is attached to the thruster by the spacer element. The adapter brackets may have an arcuate shape having one side with a radius matching an outer radius of the spacecraft thruster structure. The voltage metering circuitry may be electrically coupled to the at least one probe and includes a voltage meter having a display, the voltage meter measuring voltage of the anode assembly and including circuitry converting the voltage of the anode assembly to a voltage powering the meter.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate the same or similar elements.

DETAILED DESCRIPTION

Technology is described to enable a voltage testing measurement unit for a spacecraft thruster. The voltage measurement unit for a spacecraft thruster includes a thruster interface with a platform mounted to the thruster, which safely and accurately positions electrical probes relative to the thruster's anode assembly. Voltage metering circuitry with a voltage display is coupled to the probes and is powered by the spacecraft thruster when the spacecraft thruster is powered on. Testing personnel can power the thruster with the testing measurement unit attached and safely quickly determine if the voltage is correct for proper operation of the spacecraft. The voltage measurement testing unit disclosed herein provides a testing system which keeps testing personnel at a safe distance from a high voltage test and requires no close contact with the thruster(s) under test. The design of the voltage measurement testing unit ensures that no damage occurs to the thruster hardware and gathers measurements quickly and easily.

Figure 1:
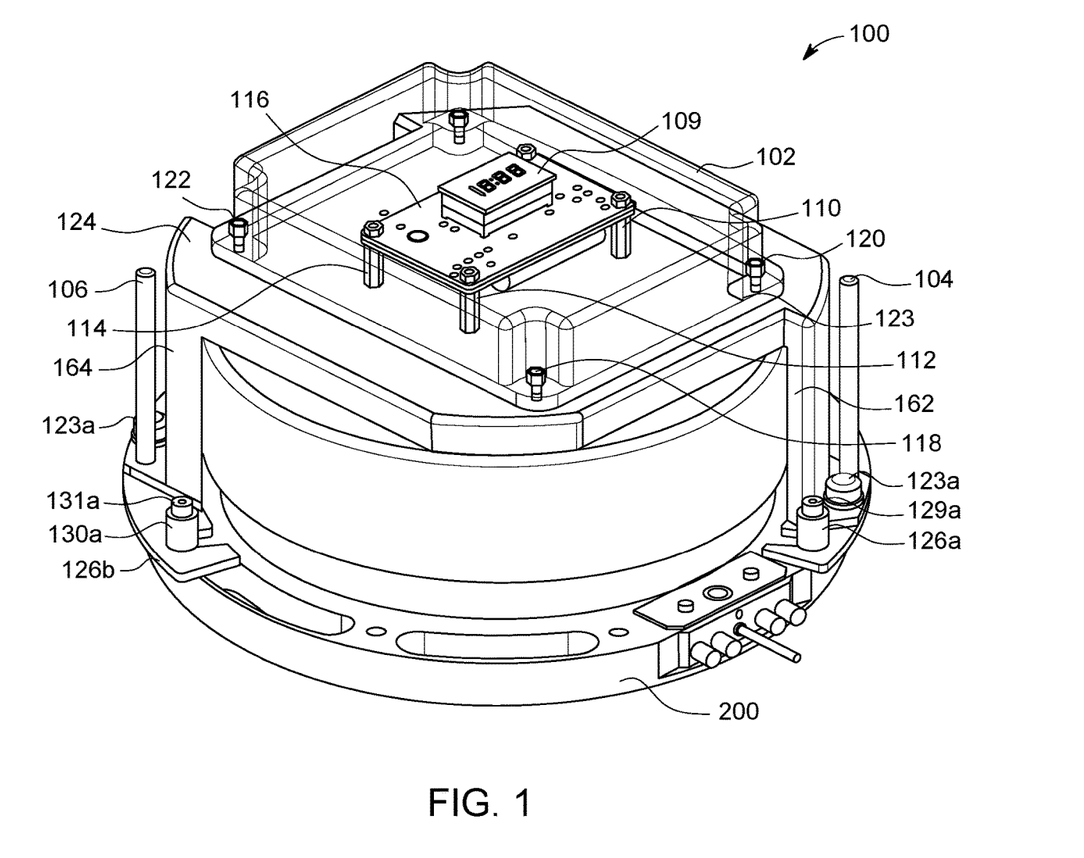
FIG. 1 an assembled, perspective view of a thruster voltage measurement unit coupled to a portion of a thruster.
Figure 2:
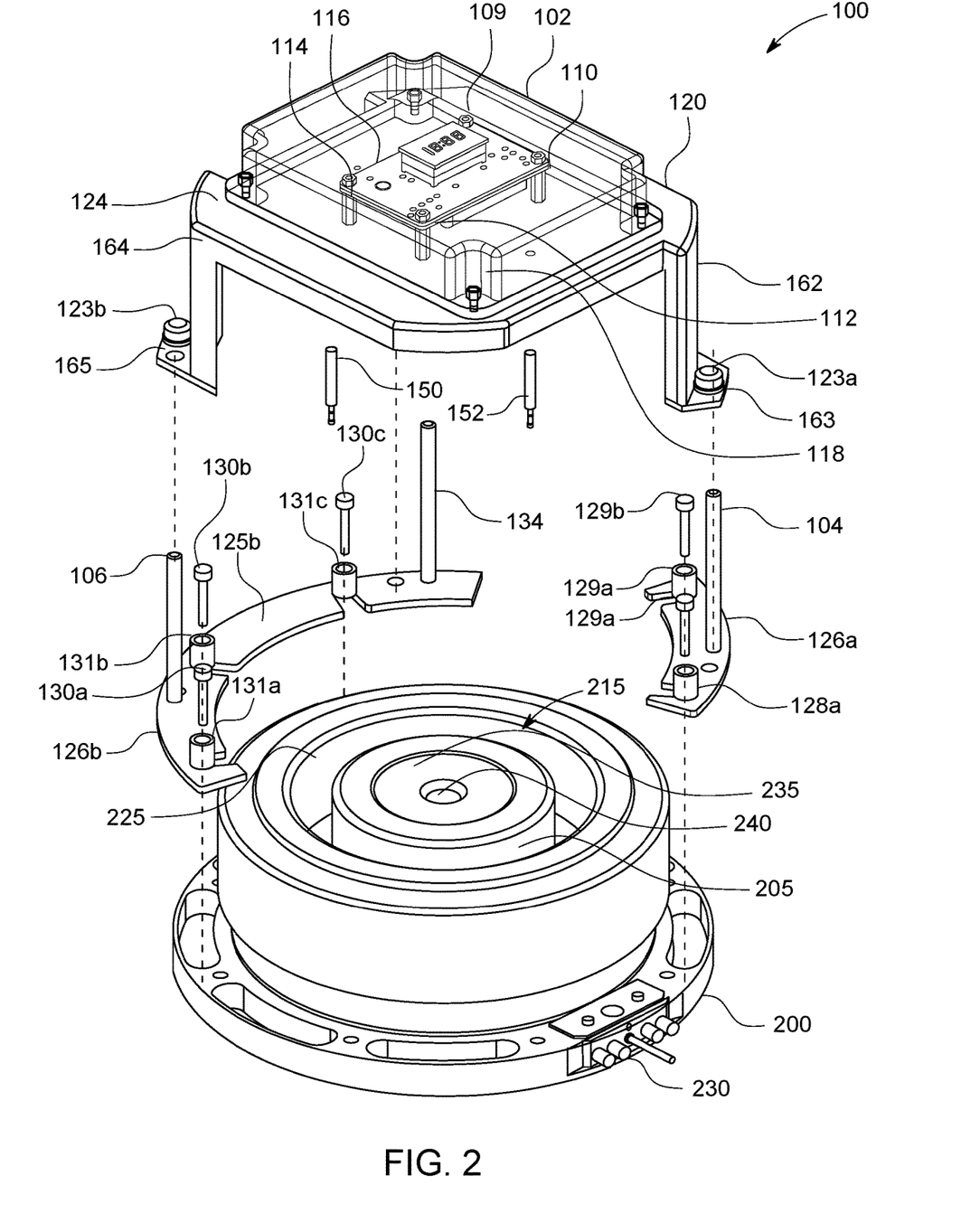
FIG. 2 an exploded view of a thruster voltage measurement unit.
Figure 4:
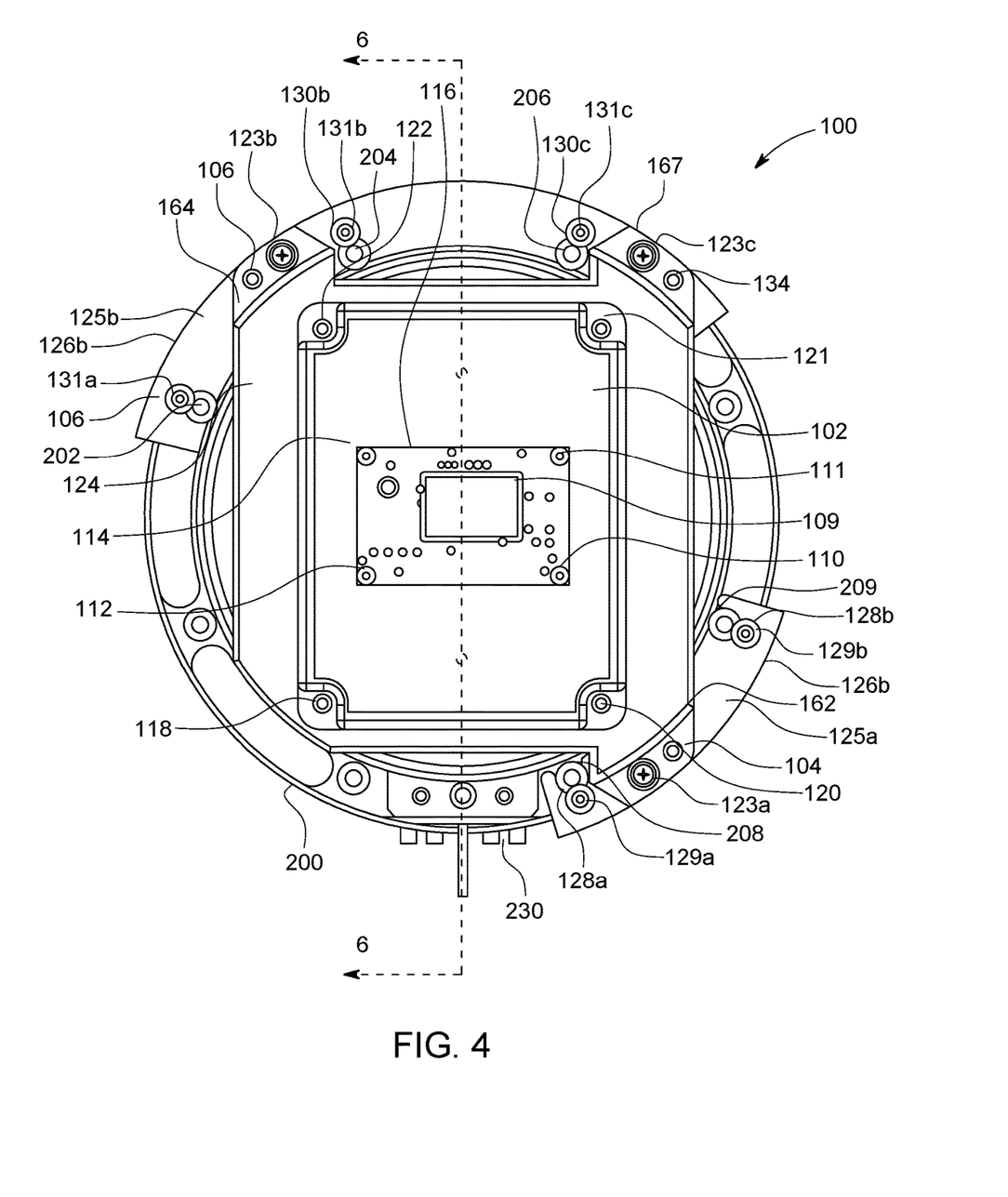
FIG. 4 is a top view of an assembled thruster voltage measurement unit coupled to a thruster.
Figure 6:
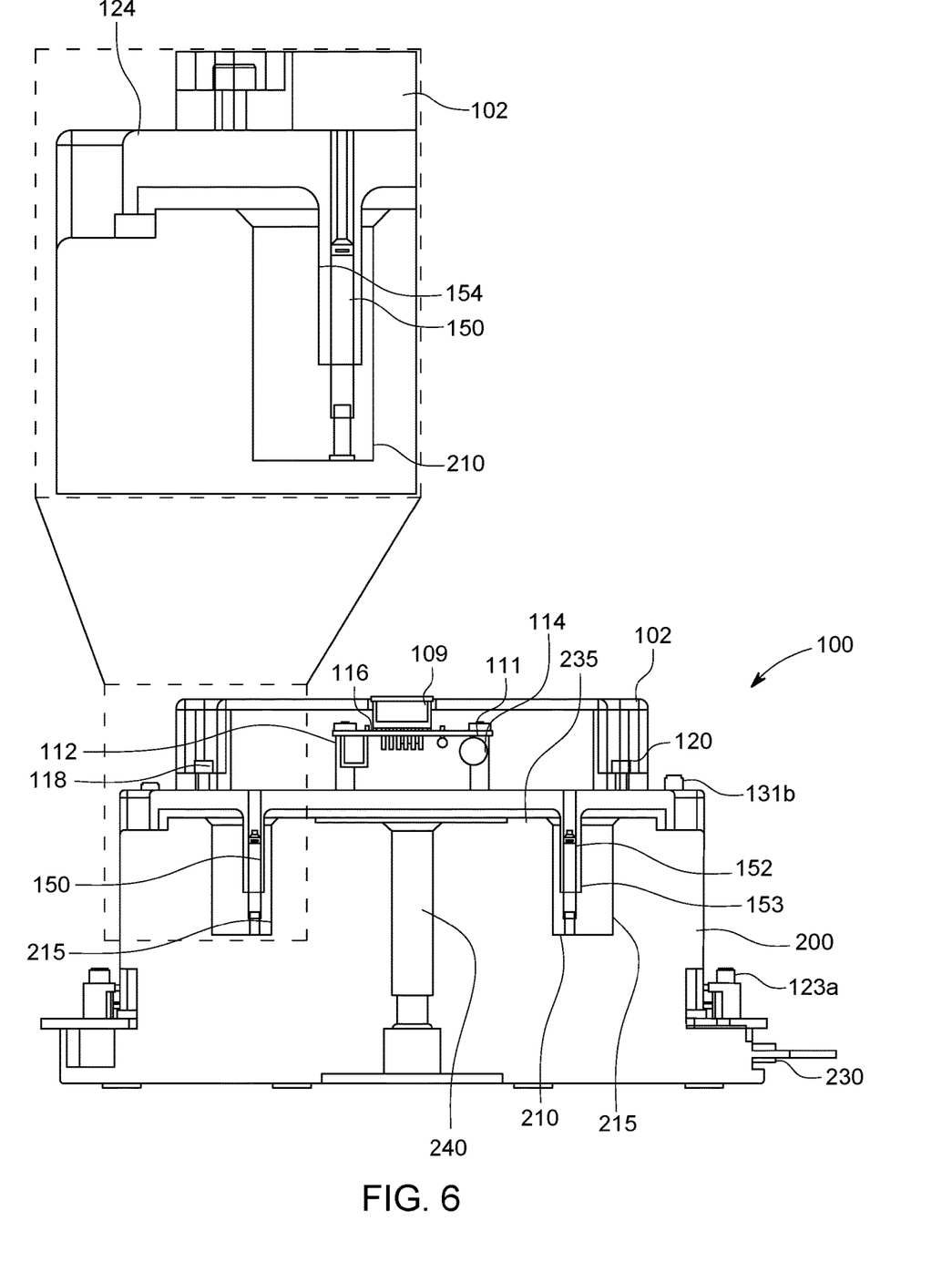
FIG. 6 shows a side, cutaway view along line 6-6 in FIG. 4, including an enlarged section illustrating connection of the probe in the measurement unit.

With respect to FIGS. 1, 2 and 6, a thruster 200 of an HET 200 is illustrated. FIG. 1 shows an assembled, perspective view of a thruster voltage measurement unit 100 coupled to a portion of a thruster 200. FIG. 2 an exploded view of a thruster voltage measurement unit. FIG. 6 shows a side, cutaway view along line 6-6 in FIG. 4.

An HET is a type of electrical thruster for spacecraft that operates on a propellant, such a xenon, to accelerate ions up to high speeds to produce thrust for maneuvering the spacecraft. Other types of propellants that may be used by the HET include, for example, krypton, argon, bismuth, iodine, magnesium, zinc and adamantane, but are not limited thereto. Such a propellant, which can also be referred to as an accelerant, is provided to the HET by a propellant management assembly (not shown) The thruster 200 is generally cylindrical and comprises an annular accelerating channel 215 defined between inner and outer walls 205, 225 respectively of a closed bottom as shown in FIGS. 2 and 6. The bottom 210 of the channel 215 includes an anode assembly (not shown) which includes sensitive ceramic material. Although the specific details of the anode ring are not illustrated in the figures, care must be taken to ensure no damage is imparted to the anode assembly during testing. A connection assembly 230 supplies an electrical connection to the anode. Although not illustrated in the figures, the HET also includes a cathode mounted adjacent to the thruster ring which is supplied with xenon gas through a connection and with a source of negative potential. An inner yoke 235 is in the shape of a spool and has a central cylindrical core with a central bore 240 for weight reduction. To measure the aforementioned voltages, good connection must be made to the anode assembly at the bottom of channel 215.

As illustrated in FIGS. 1-6, a thruster voltage measurement unit 100 includes an thruster interface or interface base 120, adapter brackets 126a, 126b, metering circuitry 116 including a display 109 covered by a top cover 102, and probes 150, 152. After attachment to the thruster 200, the probes 150, 152 enter channel 215 and engage the anode assembly at the base 210 of channel 215, the thruster 200 is powered on, and voltage measurement occurs using the metering circuitry 116 which outputs the voltage on display 109. Personnel testing the device need never come into contact with the powered thruster and can maintain a safe distance for testing. Each voltage measurement unit can be coupled to one thruster which may be one of multiple thrusters on a satellite, such that upon powering the voltage assembly, all thrusters are tested simultaneously.

In order to ensure no damage comes to the anode assembly when testing the thruster, the probes 150, 152 comprise spring loaded contact pins which engage the anode assembly. The pins are mounted in the interface base and correctly positioned relative to the anode assembly as the interface base is mounted on the thruster. In order to correctly guide the interface base 120 onto the thruster with the probes 150, 152 in the correct positions, the adapter brackets 126a, 126b are first mounted to the thruster 100. The interface base, with the voltage meter 116 and probes 150, 152 attached, is then slid down guideposts on the adapter brackets 126a, 126b which ensures correct positioning of the probes.

Figure 3:
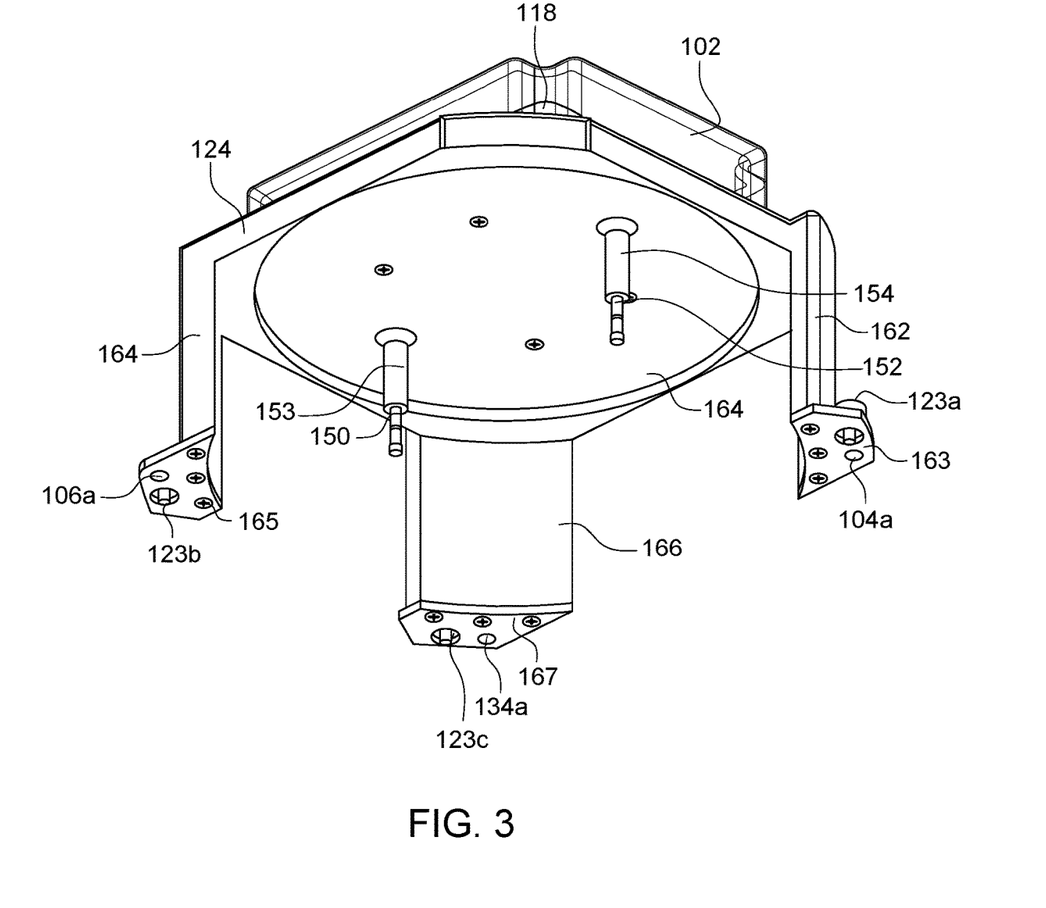
FIG. 3 is a partial perspective view of an underside of an interface base of the measurement unit according to an embodiment of the present technology.

As illustrated in FIGS. 1-3, the adapter brackets 126a, 126b have an arcuate or semi-circular shape having one side with a radius matching an outer radius of the spacecraft thruster structure and may be formed of cold rolled steel or other suitable material. Adapter bracket 126a includes a base 125a, with two mounting posts 128a, 129a receiving fasteners 128b, 129b, respectively to secure adapter bracket 126a to thruster 100. Bracket 126a includes two semi-circular detent regions which partially surround and engage thruster mounting bolts 208, 209. Fasteners 128b, 128b are threaded to engage corresponding mated threaded bores in thruster 100 to secure bracket 126a in place. Adapter bracket 126a also includes guidepost 104 which extends upward from the base 125a of bracket 126a and as described herein is used to correctly position interface base relative to the thruster 100.

Adapter bracket 126b includes a base 125b, with three mounting posts 130a, 130b and 130c receiving fasteners 131a, 131b and 131c, respectively, to secure adapter bracket 126b to thruster 100. Bracket 126b includes three semi-circular detent regions which partially surround and engage thruster mounting bolts 202, 204 and 206. Fasteners 131a, 131b and 131c are threaded to engage corresponding mated threaded bores in thruster 100 to secure bracket 126b in place. Adapter bracket 126b also includes two guideposts 106, 134 which extend upward from the base 125b of bracket 126b and as described herein are used to correctly position interface base 120 relative to the thruster 100.

Interface base 120 includes three spacer elements comprising support legs 162, 164, 166 which are adapted to be mounted to one of adapter brackets 126a and 126b. Each leg has an end (which in one embodiment comprise steel feet 163, 165, 167) which allows the leg to be attached to the thruster 200 via one of adapter bracket 126a and 126b. Each leg 162, 164, 166 acts as a spacer element to hold the platform in a position above the thruster 200 and in a position wherein probes 152, 154 are in optimal contact with the anode assembly of the thruster. Each leg 162, 164, 166 extends downward from a platform 124. Platform 124 includes a top surface upon which is mounted metering circuitry 116 which is secured to platform 124 by four nylon mounting posts 108, 110, 112, and 114. A transparent top cover 102 protects the metering circuitry 116 and is secured to the platform by fasteners 118, 120, 121 and 122. The metering circuitry includes a display 109 to show the measured voltage to testing personnel. Each leg 162, 164, 166 includes a respective foot 163, 165, 167. Each foot includes a securing fastener or screw and a guide bore. Foot 163 includes a securing screw 123a and guide bore 104a, with guide board 104a being sized to receive guide post 104 of adapter bracket 126a. Foot 165 includes a securing screw 123b and guide bore 106a, with guide bore 106a being sized to receive guide post 106 of adapter bracket 126b. Foot 167 includes a securing screw 123c and guide bore 134a, with guide bore 134a being sized to receive guide post 134 of adapter bracket 126b. The construction of the legs is such that each leg 162, 164, 166 has a length "L" (FIG. 6) such that each guide bore of each leg is at an equal distance from the platform thereby allowing each guide bore to simultaneously engage each guide post. The components including the top cover, interface base (including legs 162, 164, 166), and securing fasteners 118, 120, 121 and 122 may be formed of a high strength plastic that can operate at high surface temperatures, such as ULTEM® available from Curbell Plastics, Orchard Park, NY. Each foot 163, 165, 167 may be formed from aluminum and secured to respective legs 162, 164, 166 by fasteners (illustrated in FIG. 3).

As illustrated in FIG. 3 and in the exploded portion of FIG. 6, probes 150, 152 are secured in posts 153, 154 on the underside of platform 124 of the interface base 120. Platform 124 includes a recess region 168 having a circular shape which exceeds the exterior diameter of the thruster 100, providing additional clearance for the testing unit.

Figure 5:
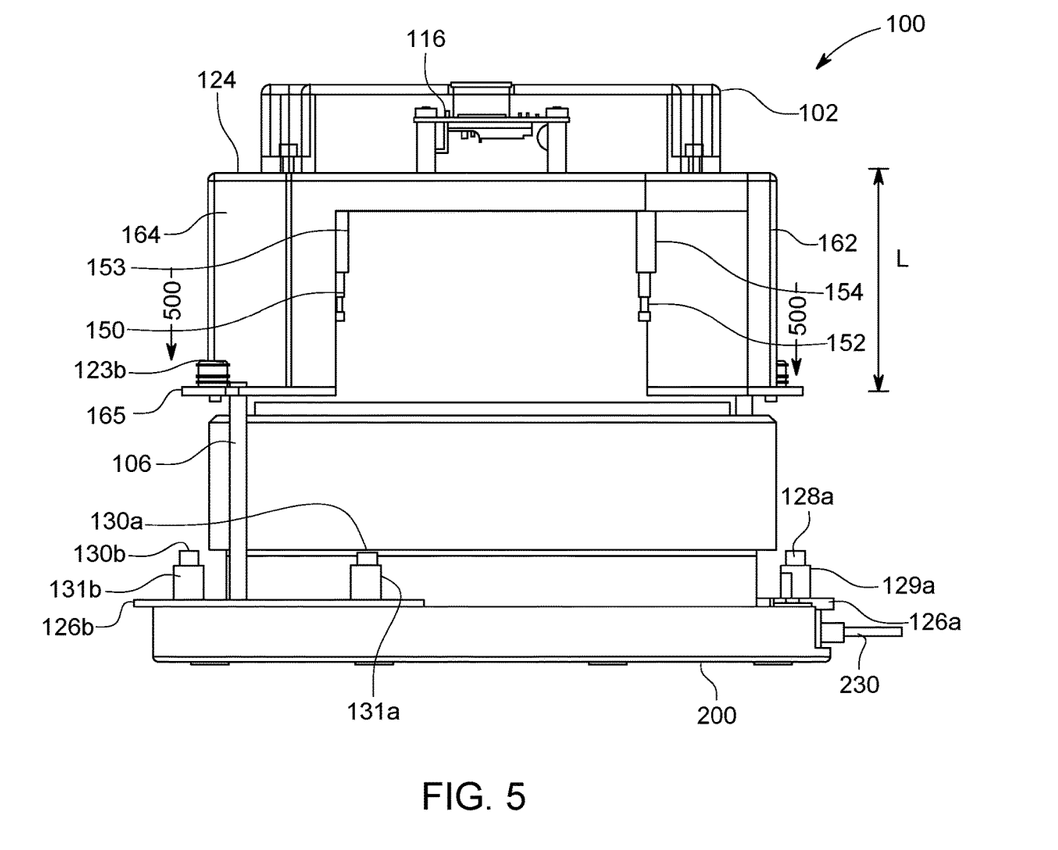
FIG. 5 shows a side view of a thruster voltage measurement unit illustrating the interface base assembly onto the adapter brackets on the thruster.

As illustrated in FIG. 5, the interface base 120 is positioned so that each guide post 104, 160, 134 aligns with a respective guide bore 104a, 106a and 134a, and the interface base is slid in the direction of arrows 500 so that feet 163, 165, 167 comes into contact with the adapter brackets 126a and 126b. The testing unit is then in position to conduct a test as probes 150 and 152 will engage the anode assembly of the thruster 100 (as shown in the enlarged region of FIG. 6.). Probes 150, 152 are spring loaded "Pogo" pins which are commercially available from Mill-max Mfg. Corp, Oyster Bay, NY. In one embodiment, a size 5 series "S" pin is used. Each probe is electrically connected to metering circuitry illustrated in FIGS. 7 and 8.

Figure 7:
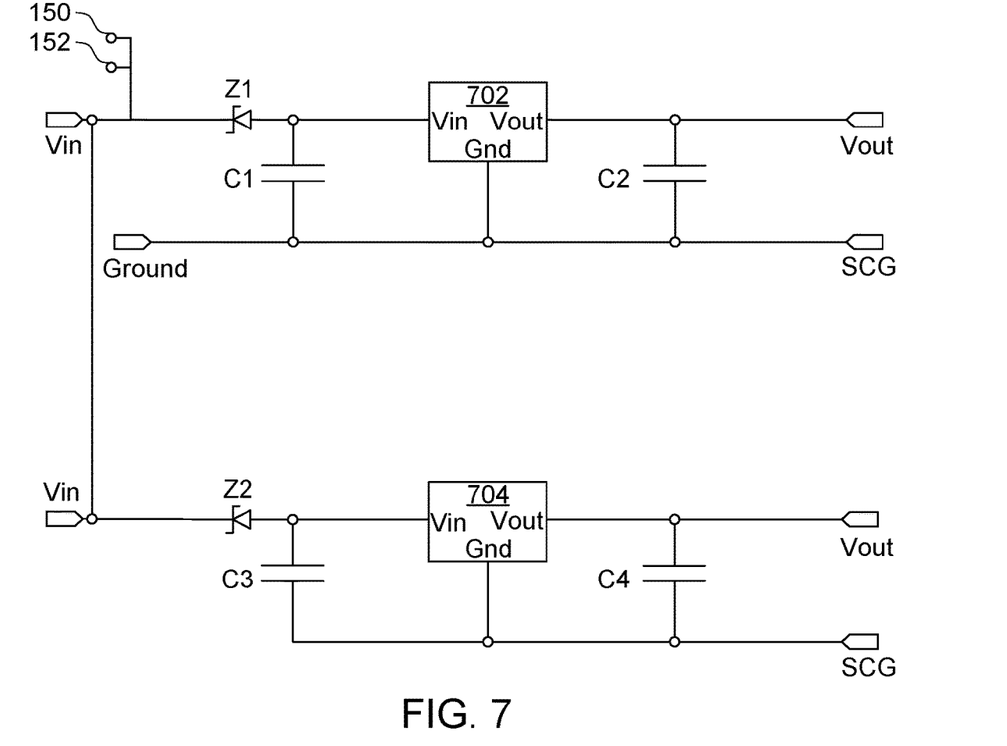
FIG. 7 illustrates a step-down voltage regulator portion of the metering circuitry of the measurement unit.
Figure 8:
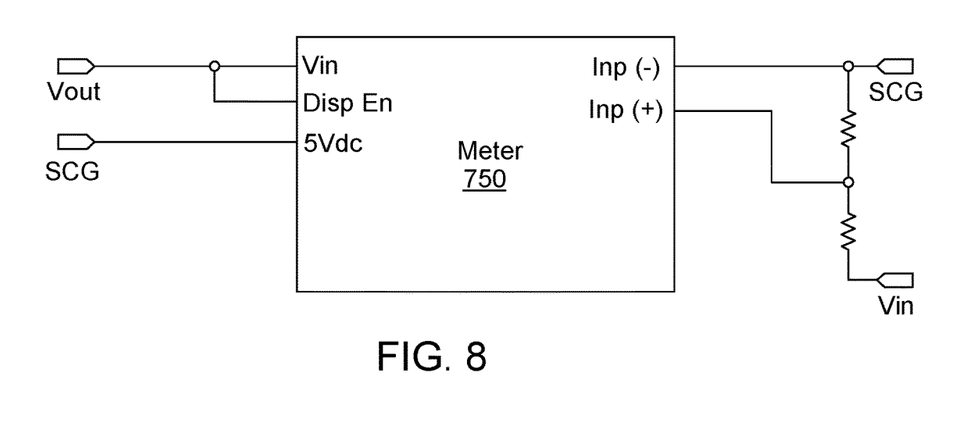
FIG. 8 illustrates a voltage meter of the metering circuitry.

FIG. 7 illustrates a first portion of the circuitry 116. FIG. 7 illustrates a step-down regulator that allows the metering circuitry 116 to use power from the thruster under testing conditions to power a commercial voltage meter which is illustrated in FIG. 8. The regulator of FIG. 7 uses two linear voltage regulators 702, 704 in parallel to convert the input voltage Vin (from the probes 152, 154) to an output voltage Vout at 5v to power the voltage meter of FIG. 8. The input voltage Vin is first proved to two Zener diodes Z1 and Z2 which reduce the input voltage to a reasonable level for the regulators 702, 704 in conjunction with input capacitors C1 and C3 (which may have a value of approximately 2.2 microfarad).

The metering circuitry 116 thus derives power from the anode assembly and is qualified over voltage range of 265-680V. In one embodiment, the linear voltage regulators comprise Onsemi model NCP785AH50T1G Wide Input Voltage Range Linear Voltage Regulators which provide an operating input voltage range of up to 450 V DC, with an output current of up to 10 mA. Use of two regulators 702, 704 in parallel allows the circuit to be qualified over a voltage range of 265-680 V, with reduced size, cost and heat dissipation. The input GND is coupled to the spacecraft on which the thruster is mounted, while output spacecraft ground SCG is used as an input to the meter 750. The circuit of FIG. 7 provides a current draw at 300V of 7 ma (2.1 W) and 11 ma (6.6 W) at 600V.

Voltage meter 750 of FIG. 8 may comprise standard commercial voltage meter which takes the input voltage Vin and SCG as input via a resistor divider comprising resistors R1 and R2 (approximately 909 KOhms and 909 ohms respectively) and displays the input voltage within an accuracy of +/−1V. As noted above, Vout from the step-down regulator of FIG. 7 powers the meter and a display enable (Disp En), along with SCG. It will be understood that other pinouts may be available on the voltage meter 750 which are not illustrated herein. Voltage meter 750 includes display 109 (not shown in FIG. 8 which illustrates the measured voltage.

Figure 9:
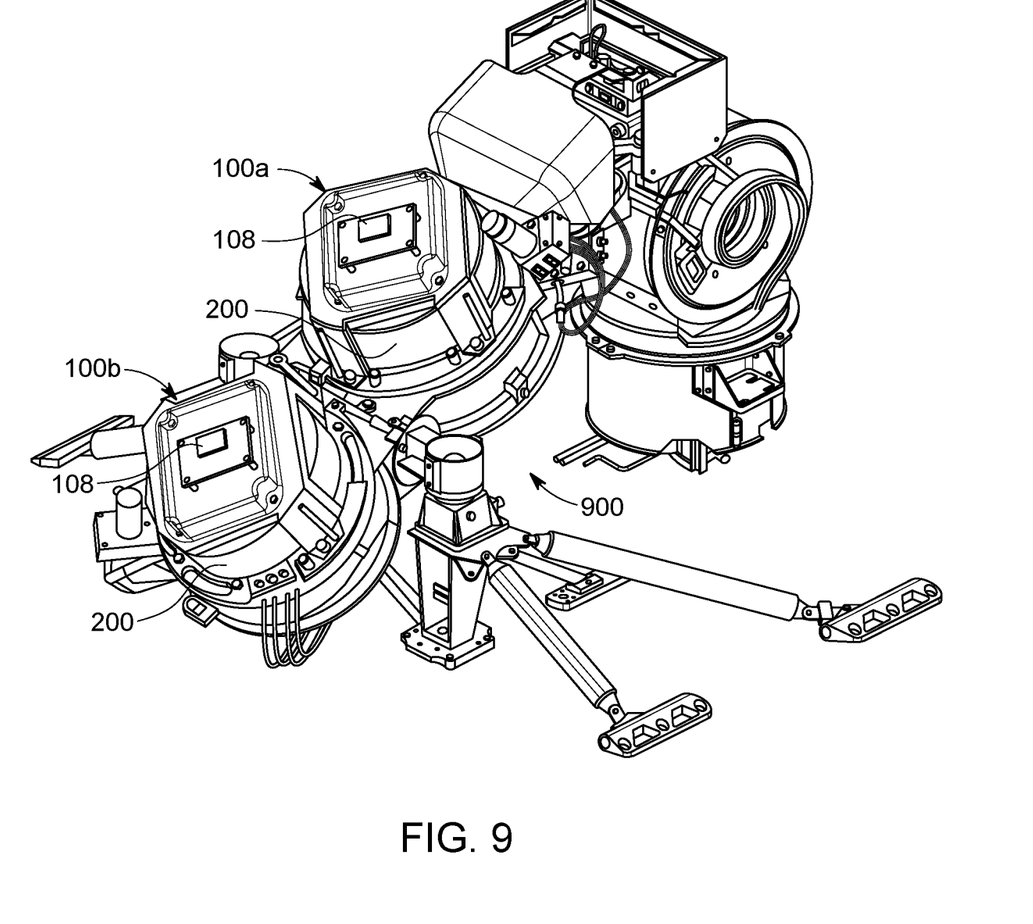
FIG. 9 illustrates multiple thrusters and measurement units on a positioning assembly of a spacecraft.
Figure 10:
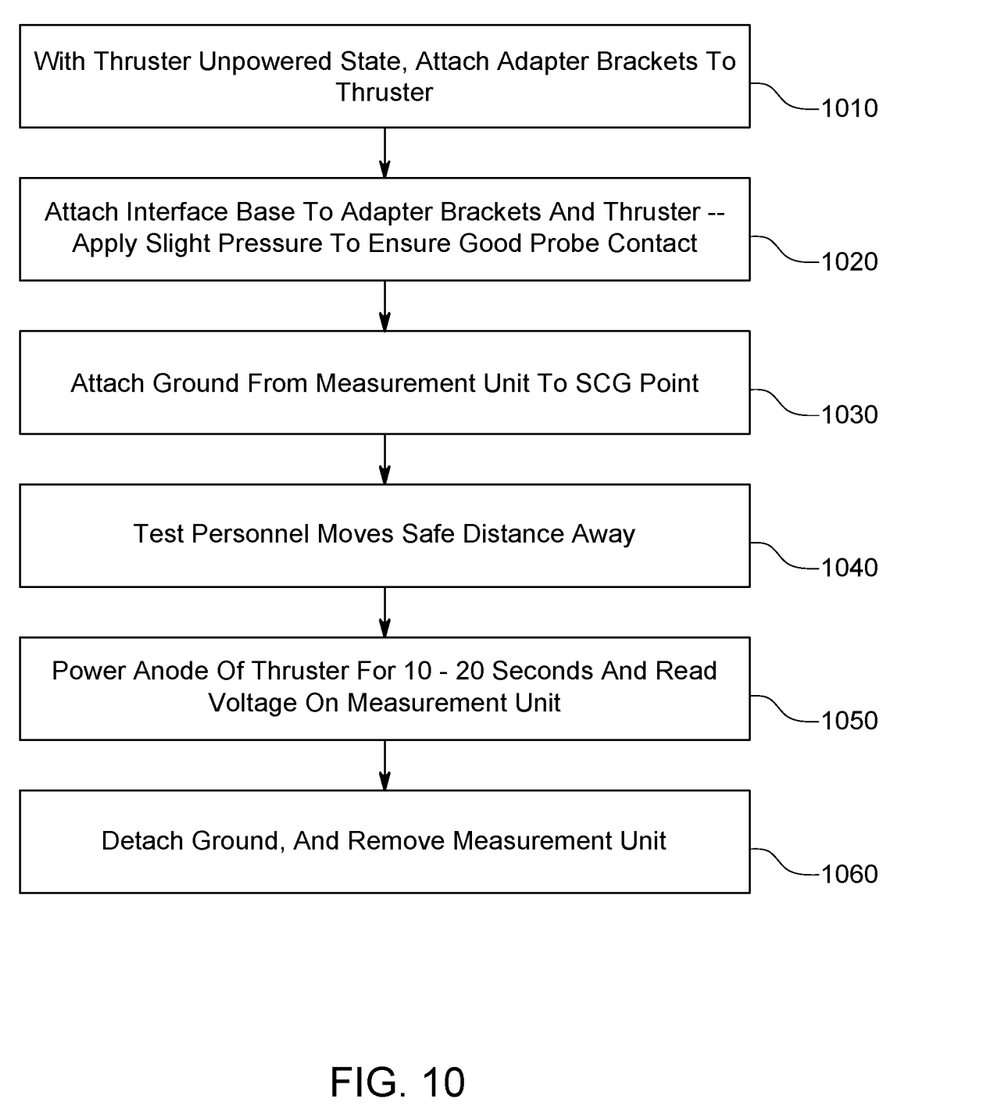
FIG. 10 illustrates a testing method for using the measurement unit.

FIG. 9 illustrates two thruster voltage measurement units 100a, 100b mounted to thrusters 200a, 200b on a spacecraft positioning assembly 900 for testing. Adjacent to the thrusters are igniters 902, 904. FIG. 10 illustrates a method for testing one or more thrusters 200a. Once the thrusters are attached to the spacecraft positioning assembly 900, at 1010, with the spacecraft in an un-powered state, adapter brackets 126a, 126b are attached to the thrusters. The measurement units 100 are assembled and attached to the thrusters by attaching the interface base to the adapter brackets at 1020. During attachment, at 1020, slight pressure is applied when sliding the interface base down guide posts 104, 106 134 to ensure good contact between probes 152, 154 and the anode assembly of the thruster. At 1030, ground is attached from the measurement unit to the SCG point of the spacecraft. At 1040, testing personnel move a safe distance away from the test units. At 1050, the thrusters are powered on by, for example, executing instructions which cause the spacecraft to power on for a measurement period of 10-20 seconds, and the voltage measured by the measurement unit is read by the test personnel. At completion, the ground connection is removed, and the measurement unit disassembled at 1060.

The voltage measurement testing unit disclosed herein provides a testing system which keeps testing personnel at a safe distance from a high voltage test and requires no close contact with the thruster(s) under test. The design of the voltage measurement testing unit ensures that no damage occurs to the thruster hardware and gathers measurements quickly and easily.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications, and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A voltage measurement apparatus for a spacecraft thruster, comprising:
   a thruster interface comprising a platform and at least one spacer element extending from the platform configured to attach the platform to the spacecraft thruster;
   at least one probe mounted to the thruster interface, the at least one probe configured to engage an anode assembly of the spacecraft thruster when the thruster interface is attached to the spacecraft thruster; and
   voltage metering circuitry coupled to the at least one probe, the voltage metering circuitry powered by the spacecraft thruster when the spacecraft thruster is powered on.

2. The voltage measurement apparatus of claim 1 wherein the thruster interface includes a plurality of spacer elements, each spacer element of the plurality of spacer elements comprising at least one arm extending from the platform, the at least one arm having an end, each end adapted to couple to the spacecraft thruster.

3. The voltage measurement apparatus of claim 2 further including at least one adapter bracket, the at least one adapter bracket configured to couple to the thruster interface between the spacecraft thruster and the at least one arm to couple the at least one arm to the spacecraft thruster.

4. The voltage measurement apparatus of claim 3 wherein the adapter bracket includes at least one guide post and the at least one arm including at least one guide bore sized to receive the guide post to align the voltage measurement apparatus relative to the spacecraft thruster.

5. The voltage measurement apparatus of claim 1 wherein the voltage metering circuitry is electrically coupled to the at least one probe and includes a voltage meter having a display, the voltage metering circuitry measuring voltage of the anode assembly and including circuitry converting the voltage of the anode assembly to a voltage powering the meter.

6. The voltage measurement apparatus of claim 1 including at least two probes, each of the at least two probes comprising a spring-loaded contact pin mounted on one side of the platform at a position of the platform which aligns with the anode assembly when the thruster interface is attached to the spacecraft thruster by the at least one spacer element.

7. The voltage measurement apparatus of claim 1 wherein:
   the thruster interface includes a first adapter bracket and a second adapter bracket, each of the first adapter bracket and the second adapter bracket including at least a respective first guide post and a respective second guide post;
   the at least one spacer element includes a first leg, a second leg and a third leg;
   each said leg includes a foot; and each foot including a guide bore sized to receive a respective guide post among the respective first guide post and a respective second guide post.

8. The voltage measurement apparatus of claim 1 wherein the platform and at least one spacer element comprise high voltage insulating, thermally resistant plastic.

9. A voltage measurement apparatus for a spacecraft thruster, comprising:
   a thruster interface comprising a first adapter bracket and a second adapter bracket, each of the first adapter bracket and the second adapter bracket including at least a respective first guide post and a respective second guide post, the thruster interface including an interface base having a platform and a plurality of legs extending in a direction from the platform, the plurality of legs including ends configured to attach the platform to the spacecraft thruster and position the platform relative to the spacecraft thruster, each of the ends having a guide bore sized to receive a respective first guide post and a respective second guide post,
   at least one probe mounted to the platform in the direction of the legs, the at least one probe configured to engage an anode assembly of the spacecraft thruster when the thruster interface is attached to the spacecraft thruster; and
   voltage metering circuitry coupled to the at least one probe, the voltage metering circuitry configured to be powered by the spacecraft thruster when the spacecraft thruster is powered on.

10. The voltage measurement apparatus of claim 9 wherein the voltage metering circuitry is electrically coupled to the at least one probe and includes a voltage meter having a display, the voltage meter measuring voltage of the anode assembly and including circuitry converting a voltage of the anode assembly to a voltage powering the meter.

11. The voltage measurement apparatus of claim 10 including at least two probes, each probe of the at least two probes comprising a spring-loaded contact pin mounted on one side of the platform at a position of the platform which aligns with the anode assembly when the thruster interface is attached to the spacecraft thruster by the spacer element.

12. The voltage measurement apparatus of claim 11 wherein:
   each end includes a foot; and
   each foot includes the guide bore.

13. The voltage measurement apparatus of claim 12 wherein the platform and arms comprise high voltage insulating, thermally resistant plastic.

14. The voltage measurement apparatus of claim 9 wherein:
   the first adapter bracket includes the respective first guide post and the second adapter bracket includes the respective second guide post;
   the first adapter bracket further includes a third guide post;
   a first of the plurality of legs is positioned to engage the respective first guide post;
   a second of the plurality of legs is positioned to engage the respective second guide post; and
   a third of the plurality of legs is positioned to engage the third guide post.

15. The voltage measurement apparatus of claim 14 wherein each leg has a length such that each guide bore of each leg is at an equal distance from the platform thereby allowing each guide bore to simultaneously engage each guide post.

16. A voltage measurement apparatus for a spacecraft thruster, comprising:
   a thruster interface comprising
      a first adapter bracket and a second adapter bracket, the first adapter bracket including at least a first guide post, the second adapter bracket including at least a second guide post,
      an interface base having a platform and a plurality of legs extending in a direction from the platform, each leg of the plurality of legs including a foot configured to attach the platform to the first adapter bracket or the second adapter bracket and position the platform relative to the spacecraft thruster,
      each foot having a guide bore sized to receive one of said guide posts,
      each leg of the plurality of legs having a length such that each guide bore of each leg is at an equal distance from the platform thereby allowing each guide bore to simultaneously engage each guide post;
   at least one contact probe mounted to the platform in the direction of the legs, the at least one probe configured to engage an anode assembly of the spacecraft thruster when the thruster interface is attached to the spacecraft thruster; and
   voltage metering circuitry coupled to the at least one probe, the voltage metering circuitry powered by the spacecraft thruster when the spacecraft thruster is powered on.

17. The voltage measurement apparatus of claim 16 wherein the platform and arms comprise high voltage insulating, thermally resistant plastic, and the feet and adapter bracket comprise steel.

18. The voltage measurement apparatus of claim 17 including at least two probes, each probe comprising a spring-loaded contact pin mounted on one side of the platform at a position of the platform which aligns with the anode assembly when the thruster interface is attached to the spacecraft thruster by the spacer element.

19. The voltage measurement apparatus of claim 16 wherein the adapter brackets have an arcuate shape having one side with a radius matching an outer radius of the spacecraft thruster structure.

20. The voltage measurement apparatus of claim 16 wherein the voltage metering circuitry is electrically coupled to the at least one probe and includes a voltage meter having a display, the voltage meter measuring a voltage of the anode assembly and including circuitry converting the voltage of the anode assembly to a voltage powering the meter.

* * * * *